(12) United States Patent
Wen et al.

(10) Patent No.: US 11,014,077 B2
(45) Date of Patent: May 25, 2021

(54) ACTIVE SCR CATALYST

(71) Applicant: UMICORE AG & CO. KG, Hanau-Wolfgang (DE)

(72) Inventors: Fei Wen, Kahl am Main (DE); Nicola Soeger, Nidderau (DE); Jürgen Gieshoff, Gelnhausen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 71 days.

(21) Appl. No.: 16/096,126

(22) PCT Filed: May 2, 2017

(86) PCT No.: PCT/EP2017/060379
§ 371 (c)(1),
(2) Date: Oct. 24, 2018

(87) PCT Pub. No.: WO2017/191111
PCT Pub. Date: Nov. 9, 2017

(65) Prior Publication Data
US 2019/0134615 A1 May 9, 2019

(30) Foreign Application Priority Data
May 3, 2016 (EP) .................................. 16168137

(51) Int. Cl.
| B01J 29/56 | (2006.01) |
| B01J 29/76 | (2006.01) |
| F01N 3/20 | (2006.01) |
| B01J 37/02 | (2006.01) |
| B01J 35/04 | (2006.01) |
| F01N 3/035 | (2006.01) |
| B01J 29/58 | (2006.01) |
| B01J 29/78 | (2006.01) |
| B01D 53/94 | (2006.01) |
| B01J 23/30 | (2006.01) |
| B01J 35/10 | (2006.01) |
| B01J 37/30 | (2006.01) |

(52) U.S. Cl.
CPC ............ B01J 29/56 (2013.01); B01D 53/944 (2013.01); B01D 53/9413 (2013.01); B01D 53/9418 (2013.01); B01J 23/30 (2013.01); B01J 29/58 (2013.01); B01J 29/76 (2013.01); B01J 29/78 (2013.01); B01J 35/04 (2013.01); B01J 35/1057 (2013.01); B01J 37/0246 (2013.01); B01J 37/30 (2013.01); F01N 3/035 (2013.01); F01N 3/208 (2013.01); F01N 3/2066 (2013.01); B01D 2255/20738 (2013.01); B01D 2255/20761 (2013.01); B01D 2255/50 (2013.01); B01D 2255/9155 (2013.01); B01J 2229/186 (2013.01); F01N 2250/02 (2013.01); F01N 2370/04 (2013.01); F01N 2610/02 (2013.01)

(58) Field of Classification Search
None
See application file for complete search history.

(56) References Cited

U.S. PATENT DOCUMENTS

| 9,561,469 B2* | 2/2017 | Fedeyko ................. B01J 29/76 |
| 2011/0113761 A1* | 5/2011 | Boorse ................ F01N 3/0222 60/297 |
| 2012/0014867 A1* | 1/2012 | Bull ......................... B01J 29/68 423/700 |
| 2013/0089494 A1 | 4/2013 | Reichinger et al. |
| 2013/0202524 A1* | 8/2013 | Maurer ............... B01D 5/8628 423/709 |
| 2014/0154175 A1 | 6/2014 | Li et al. |
| 2015/0037233 A1* | 2/2015 | Fedeyko ................. B01J 35/04 423/239.1 |
| 2015/0078989 A1* | 3/2015 | Fedeyko ............... B01J 37/031 423/700 |
| 2015/0290532 A1 | 10/2015 | Lambert et al. |
| 2015/0290632 A1* | 10/2015 | Lambert ................. B01J 29/88 423/705 |
| 2016/0367941 A1* | 12/2016 | Gilbert ............... B01D 53/9436 |
| 2017/0218809 A1 | 8/2017 | Hoyer et al. |

FOREIGN PATENT DOCUMENTS

| DE | 10 2010 007 626 A1 | 8/2011 |
| EP | 2 520 365 A2 | 11/2012 |
| EP | 2 878 361 A1 | 6/2015 |
| EP | 2 985 068 A1 | 2/2016 |
| WO | 2008/106519 A1 | 9/2008 |
| WO | 2008/118434 A1 | 10/2008 |
| WO | 2008/132452 A2 | 11/2008 |
| WO | 2010/043891 A1 | 4/2010 |
| WO | 2010043891 * | 4/2010 |
| WO | 2011/045252 A1 | 4/2011 |

(Continued)

OTHER PUBLICATIONS

Baerlocher, Ch. et al. Atlas of Zeolite Framework Types. 5th revised edition. 2001, pp. 1-303.
Written Opinion of the International Searching Authority for international Patent Application No. PCT/EP2017/060379 dated Jul. 18, 2017 (10 pages in German with translation).
International Preliminary Report on Patentability for International Patent Application No. PCT/EP2017/060379 dated Nov. 6, 2018 (11 pages in German with translation).
International Search Report for PCT/EP2017/060379, dated Jul. 18, 2017 in English and German Language (8 pgs.).
SAE International 2001-01-3625, "Recent Advances in the Development of Urea-SCR for Automotive Applications". M. Koebel, et al. (12 pgs.).

(Continued)

Primary Examiner — Sheng H Davis
(74) Attorney, Agent, or Firm — Smith, Gambrell & Russell, LLP

(57) ABSTRACT

The invention relates to a catalyst comprising a small-pore zeolite that contains iron and copper and has a maximum ring size of eight tetrahedral atoms, characterized in that the channel width of the small-pore zeolite amounts to >3.8 Å (0.38 nm) in at least one dimension.

25 Claims, 3 Drawing Sheets

(56) References Cited

FOREIGN PATENT DOCUMENTS

WO     2013/082560 A1    6/2013
WO     2013/126619 A1    8/2013

OTHER PUBLICATIONS

Indian Examination Report dated Jul. 27, 2020 for India Patent Application No. 2018/47044994 (6 pages).

\* cited by examiner

ACTIVE SCR CATALYST

The present invention relates to an active SCR catalyst for reducing nitrogen oxides in the exhaust gas of combustion engines.

Exhaust gases from motor vehicles with a predominantly lean-operated combustion engine contain, in particular, the primary emissions of carbon monoxide CO, hydrocarbons HC, and nitrogen oxides NOx in addition to particle emissions. Due to the relatively high oxygen content of up to 15 vol %, carbon monoxide and hydrocarbons can be made harmless relatively easily by oxidation. However, the reduction of nitrogen oxides into nitrogen turns out to be significantly more difficult.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia. The ammonia used as reducing agent may be made available by feeding an ammonia precursor compound, for example urea, ammonium carbamate, or ammonium formate, into the exhaust gas stream, and by subsequent hydrolysis.

Certain metal-exchanged zeolites can be used as SCR catalysts, for example. Zeolites are often subdivided by the ring size of their largest pore openings into large-, medium- and small-pore zeolites. Large-pore zeolites have a maximum ring size of 12 and medium-pore zeolites have a maximum ring size of 10. Small-pore zeolites have a maximum ring size of 8.

In the field of heavy-duty vehicles, SCR catalysts based on iron-exchanged β zeolites, i.e. a large-pore zeolite, have been used in the past to a large extent. With these products, however, a strongly pronounced agglomeration of iron particles and a dealumination of the zeolite structure are observed with increasing service life. The hydrothermal stability of SCR catalysts based on iron-exchanged β zeolites can thus not satisfy increased requirements.

SCR catalysts based on small-pore zeolites are also already known, see, for example, US2014/154175, WO2010/043891 A1, WO2008/106519 A1, WO2008/1118434 A1 and WO2008/132452 A2. The document mentioned last discloses a large number of small-pore zeolites, inter alia also the structure types EAB, ERI and LEV. However, SCR catalysts based on iron-exchanged small-pore zeolites have been found to exhibit weaknesses in the fresh state.

SCR catalysts based on copper-exchanged small-pore zeolites, in particular based on copper-exchanged chabazite, are also already known from the above-mentioned documents and from EP 2 878 361 A1.

It is also already known from EP 2520365 A2 to mix a first molecular sieve containing a first metal with a second molecular sieve containing a second metal.

WO2013/126619 A1 also already discloses zeolites which are exchanged with two metals, for example iron and copper. According to this document, chabazite exchanged with iron and copper (SSZ-13, see examples 1 to 3) has advantages if equal parts NO and $NO_2$ are present in the exhaust gas and the so-called fast SCR reaction can thus proceed according to the reaction equation

WO2013/082560 A1 describes a microporous crystalline material which has an SAR value of 3 to 10 and contains a first metal selected from the alkaline earth group, the rare earth group, the alkali group or mixtures thereof and a second material selected from copper, iron or mixtures thereof.

WO2010/043891 A1 discloses small-pore aluminosilicate zeolites which have an average crystallite size of >0.5 micrometers. These are the structure types CHA, ERI and LEV, with CHA being preferred. In embodiments, the zeolites may contain copper and iron.

WO2011/045252 A1 discloses a copper-containing zeolite of the structure type LEV having an SAR value of less than 30 and a Cu:Al ratio of less than 0.45. In addition to copper, the zeolite can contain one or more transition metals, iron also being mentioned.

US2012/014867 discloses a copper-containing zeolite of the structure type ZSM-34, OFF and/or ERI, with an SAR value of 4 to 50, ZSM-5 being preferred. In addition to copper, the zeolite can contain one or more transition metals, iron also being mentioned.

EP 2985068A1 discloses a catalyst system comprising a nitrogen oxide storage catalyst and an SCR catalyst. The SCR catalyst of this system may be selected from a series of zeolites including ERI and LEV. Cobalt, iron, copper or mixtures of two or three of these metals are disclosed as metals.

US 2015/290632 describes a CuFe/CHA system wherein iron is incorporated during chabazite synthesis and copper is incorporated in a subsequent ion exchange step. In the aged state, this product shows a better SCR activity in the temperature range >350° C. than Cu/CHA but a poorer SCR activity in the temperature range <350° C.

The heavy-duty field continues to have a need for SCR catalysts characterized by sufficient activity in the fresh state and by high hydrothermal stability. In particular, suitable catalysts are also to be sufficiently SCR-active in the so-called standard SCR reaction according to the reaction equation

i.e., in the absence of $NO_2$.

It has now surprisingly been found that SCR catalysts based on certain small-pore zeolites that are exchanged both with iron and with copper meet these requirements.

The present invention relates to a catalyst comprising a small-pore, iron- and copper-containing zeolite with a maximum ring size of eight tetrahedral atoms, characterized in that the channel width of the small-pore zeolite amounts to >0.38 nm (3.8 Å) in at least one dimension.

Within the scope of the present invention, the term "channel width" is to be understood as the term "crystallographic free diameter of the channels" as defined in Ch. Baerlocher, Atlas of Zeolite Framework Types, 6th revised edition 2007 (see page 8). According to the invention, the channel width must be >0.38 nm (3.8 Å) in at least one dimension. The channel width in the other dimension is not critical within the scope of the present invention.

In one embodiment of the present invention, the channel width of the small-pore zeolite is >0.47 nm (4.7 Å) in at least one dimension.

Small-pore zeolites with a maximum ring size of eight tetrahedral atoms and a channel width of >0.38 nm (3.8 Å) in at least one dimension are identified in Appendix E of the Atlas of Zeolite Framework Types.

In embodiments of the present invention, the small-pore zeolite having a maximum ring size of eight tetrahedral atoms and a channel width >0.38 nm (3.8 Å) in at least one dimension is of the structure type EAB (channel width of 0.51 nm (5.1 Å) in at least one dimension), ERI (channel width of 0.51 nm (5.1 Å) in at least one dimension), ESV (channel width of 0.47 nm (4.7 Å) in at least one dimension), JBW (channel width of 0.48 nm (4.8 Å) in at least one dimension) or LEV (channel width of 0.48 nm (4.8 Å) in at least one dimension), ERI and LEV being preferred.

The channel width of CHA is 0.38 nm (3.8 Å) in both dimensions, so that this structure type is not within the scope of the present invention.

As zeolites of the EAB structure type can be used all zeolites of this type that are known to the person skilled in the art. Examples are TMA-E and bellbergite.

As zeolites of the ERI structure type can be used all zeolites of this type that are known to the person skilled in the art. These include naturally occurring but preferably synthetically produced erionites. Examples are Linde T, LZ-220 and ZSM-34 but in particular materials designated as "erionite."

As zeolites of the ESV structure type can be used all zeolites of this type that are known to the person skilled in the art. An example is ERS-7.

As zeolites of the JBW structure type can be used all zeolites of this type that are known to the person skilled in the art. An example is Na-J.

As zeolites of the LEV structure type can be used all zeolites of this type that are known to the person skilled in the art. Examples are Nu-3, ZK-20, RUB-1 and LZ-132 but in particular materials called "levyne."

Within the scope of the present invention, the term "zeolite" refers to not only aluminosilicates but also so-called zeolite-like compounds of the type silicoaluminophosphate or aluminophosphate to the extent that they have a structure according to the invention. Examples of the ERI structure type are SAPO-17 and AlPO-17 and of the LEV structure type SAPO-35 and AlPO-35.

In embodiments of the present invention, the small-pore zeolite has an SAR value of 1 to 50, preferably of 5 to 35. The person skilled in the art understands the SAR value to be the molar silica-to-alumina ratio.

In preferred embodiments of the present invention, the small-pore zeolite is of the structure type ERI and has an SAR value of 5 to 15, in particular of 5 to 10.

In further preferred embodiments of the present invention, the small-pore zeolite is of the structure type LEV and has an SAR value of 20 to 40, for example of 30 to 40 or of to 35 or of 30 to 35.

In embodiments of the present invention, the small-pore zeolite contains copper in an amount of 0.2 to 3 wt. %, preferably of 1 to less than 2 wt. %, about 1 to 1.9 wt. %, calculated as Cu, and iron in an amount of 0.2 to 3 wt. %, preferably 1 to 2 wt. %, calculated as Fe, and in each case based on the total weight of the exchanged zeolite. The small-pore zeolite particularly preferably contains copper in an amount of 1.5 wt. %, calculated as Cu, and iron in an amount of 1.3 wt. %, calculated as Fe, and in each case based on the total weight of the exchanged zeolite. In this embodiment, the atomic ratio of copper to iron is 1.

In preferred embodiments of the present invention, the small-pore zeolite is of the structure type ERI and the molar ratio of Cu:Al is 0.03 to 0.10, in particular 0.05 to 0.09. The molar ratio of (Cu+Fe):Al is 0.12 to 0.2, in particular 0.13 to 0.17.

In further preferred embodiments of the present invention, the small-pore zeolite is of the structure type LEV and the molar ratio of Cu:Al is 0.15 to 0.30, in particular 0.18 to 0.25. The molar ratio of (Cu+Fe):Al is 0.32 to 0.50, in particular 0.39 to 0.47.

In embodiments of the present invention, the small-pore zeolite contains no further metal besides copper and iron. In particular, the small-pore zeolite contains no alkali metal, no alkaline earth metal and no rare earth metal. Moreover, the small-pore zeolite in particular contains no cobalt.

The catalyst according to the invention can be easily produced according to methods known per se.

For example, it can be obtained by solid-state sublimation. For this purpose, a dry, intimate mixture of a small-pore zeolite with a copper and an iron compound, for example the respective acetylacetonates, is provided, which is subsequently decomposed into metal or metal ion at temperatures of 100 to 600° C. Subsequently, a calcination is carried out at a temperature and for a time period that is high enough and long enough respectively in order to accomplish the solid-state sublimation of copper and iron in the small-pore zeolites. The resulting powder is then dispersed in water and a binder, for example boehmite or silica gel, is added. The mixture obtained then only has to be stirred or homogenized and can be used directly as a coating suspension (washcoat) for coating a carrier substrate. Alternatively, the catalysts according to the invention can also be produced by slurrying a small-pore zeolite, for example in its sodium, potassium or ammonium form, in water and then adding the corresponding amounts of soluble copper and iron salts. The acetates are used in particular as soluble salts.

In embodiments of the catalyst according to the invention, it is present in the form of a coating on a carrier substrate. Carrier substrates can be so-called flow-through substrates or wall-flow filters.

Both can consist of inert materials, for example silicon carbide, aluminum titanate or cordierite. Such carrier substrates are known to the person skilled in the art and are commercially available.

However, the carrier substrates themselves can also be catalytically active and contain catalytically active material, for example SCR catalytically active material. Considered as SCR catalytically active materials for this purpose are in principle all materials known to the person skilled in the art, i.e. for example those based on mixed oxide and those based on metal-exchanged zeolitic compounds, in particular Cu- and/or Fe-exchanged zeolitic compounds. In particular, mixed oxides containing vanadium, titanium and tungsten compounds come into consideration for this purpose. These carrier substrates contain a matrix component in addition to the catalytically active material. All inert materials that are also otherwise used to produce catalyst substrates can be used as matrix components. These are, for example, silicates, oxides, nitrides, or carbides, wherein in particular magnesium aluminum silicates are preferred.

In other embodiments of the catalyst according to the invention, it is itself present as part of a carrier substrate, i.e. for example of a flow-through substrate or wall-flow filter. Such carrier substrates additionally contain the matrix components already described above. Carrier substrates containing catalysts according to the invention can be used as such in exhaust gas purification. However, they can also in turn be coated with catalytically active materials, for example SCR catalytically active materials. If these materials are to be SCR catalytically active, the aforementioned SCR catalysts come into consideration.

In order to produce catalytically active carrier substrates, a mixture consisting of, for example, 10 to 95 wt. % of an inert matrix component and 5 to 90 wt % of catalytically active material is, for example, extruded according to methods known per se. As already described above, all inert materials that are also otherwise used to produce catalyst substrates can be used as matrix components. These are, for example, silicates, oxides, nitrides, or carbides, wherein in particular magnesium aluminum silicates are preferred.

Applying the catalyst according to the invention to the inert or itself catalytically active carrier substrate and applying a catalytically active coating to a carrier substrate comprising a catalyst according to the invention may be carried out by methods known to the person skilled in the art, thus for instance according to the usual dip coating methods or pump and suck coating methods with subsequent thermal post-treatment (calcination). The person skilled in the art knows that in the case of wall-flow filters, the latter's average pore size and the average particle size of the catalyst according to the invention can be adapted to each other such that the resulting coating lies on the porous walls that form the channels of the wall-flow filter (on-wall coating). However, average pore size and average particle size are preferably adapted to one another such that the catalyst according to the invention is located in the porous walls that form the channels of the wall-flow filter, that a coating of the inner pore surfaces thus takes place (in-wall coating). In this instance, the average particle size of the catalyst according to the invention must be small enough to penetrate into the pores of the wall-flow filter.

The catalyst according to the invention may advantageously be used to purify exhaust gas from lean-operated combustion engines, particularly diesel engines. It converts nitrogen oxides contained in the exhaust gas into the harmless compounds nitrogen and water.

The present invention thus also relates to a method for purifying the exhaust gas of lean-operated combustion engines, characterized in that the exhaust gas is passed over a catalyst according to the invention.

In the method according to the invention, ammonia is preferably used as reducing agent. For example, the required ammonia may be formed in the exhaust gas system upstream of the particle filter according to the invention, e.g., by means of an upstream nitrogen oxide storage catalyst ("lean NOx trap"-LNT). This method is known as "passive SCR." However, ammonia can also be carried in a suitable form, for example in the form of urea, ammonium carbamate or ammonium formate, and added to the exhaust gas stream as needed. It is common to also carry aqueous urea solution and to meter said aqueous solution into the catalyst according to the invention upstream thereof via an injector as needed.

The present invention accordingly also relates to a system for purifying exhaust gas from lean-operated combustion engines, characterized in that it comprises a catalyst according to the invention, preferably in the form of a coating on a carrier substrate or as part of a carrier substrate as well as an injector for aqueous urea solution, wherein the injector is located upstream of the catalyst according to the invention.

It is, for example, known from SAE-2001-01-3625 that the SCR reaction with ammonia proceeds more quickly if the nitrogen oxides are present in a 1:1 mixture of nitrogen monoxide and nitrogen dioxide, or in any event approach this ratio. Since the exhaust gas of lean-operated combustion engines normally has an excess of nitrogen monoxide compared to nitrogen dioxide, the document proposes to increase the proportion of nitrogen dioxide with the aid of an oxidation catalyst. The method according to the invention can be used not only in the standard SCR reaction, i.e. in the absence of nitrogen dioxide, but also in the rapid SCR reaction, i.e. when a portion of the nitrogen monoxide has been oxidized to nitrogen dioxide, so that ideally a 1:1 mixture of nitrogen monoxide and nitrogen dioxide is present.

The present invention thus also relates to a system for purifying exhaust gas from lean-operated combustion engines, characterized in that it comprises an oxidation catalyst, an injector for aqueous urea solution and a catalyst according to the invention, preferably in the form of a coating on a carrier substrate or as part of a carrier substrate. In embodiments of the present invention, platinum on a carrier material is used as oxidation catalyst.

All materials that are known to the person skilled in the art for this purpose are considered as carrier materials. They have a BET surface of 30 to 250 $m^2/g$, preferably of 100 to 200 $m^2/g$ (determined according to DIN 66132), and are in particular aluminum oxide, silicon oxide, magnesium oxide, titanium oxide, zirconium oxide, cerium oxide, and mixtures or mixed oxides of at least two of these oxides. Aluminum oxide and aluminum/silicon mixed oxides are preferred. If aluminum oxide is used, it is particularly preferably stabilized, for example with lanthanum oxide. The system according to the invention is used such that an oxidation catalyst, then an injector for aqueous urea solution and lastly a catalyst according to the invention are arranged in the direction of flow of the exhaust gas.

The catalyst according to the invention surprisingly has advantages in comparison to small-pore zeolites that are exchanged only with copper or only with iron. In addition, it also has advantages in comparison to zeolites of the chabazite type that are exchanged with copper and iron.

The invention is explained in more detail in the following examples and figures.

EXAMPLE 1

Figure 1:
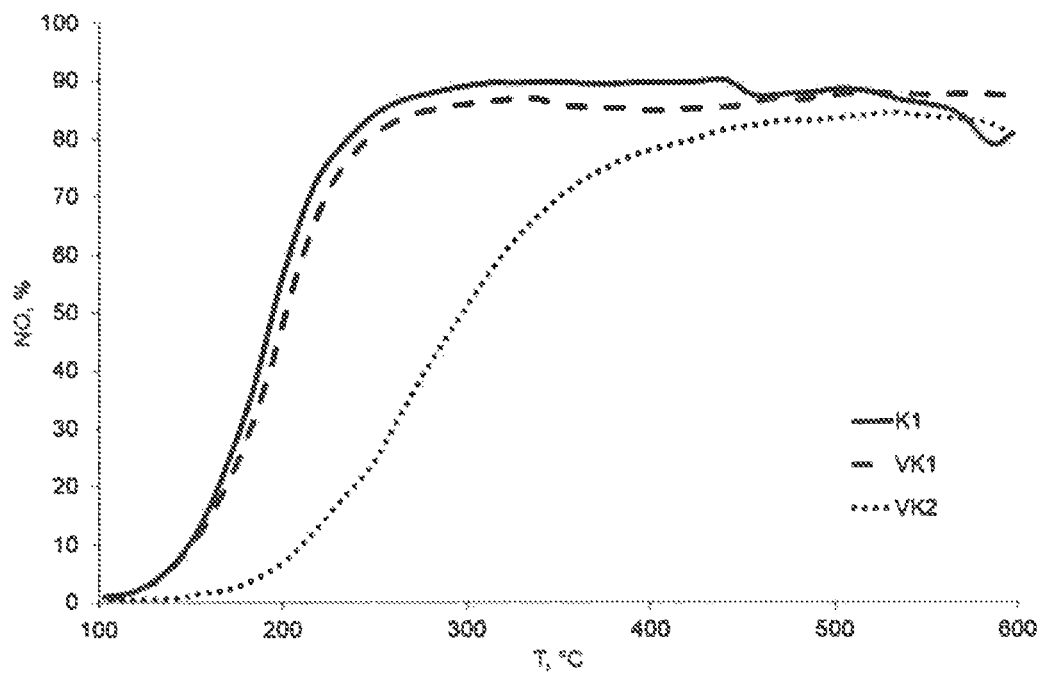
FIG. 1 shows the SCR activity of K1, VK1 and VK2 in the fresh state

1.24 g copper acetylacetonate (24.4 wt. % Cu) and 1.65 iron acetylacetonate (15.8 wt. % Fe) were roughly mixed with 19.8 g of an erionite having an SAR value of 8, homogenized and then calcined at 550° C. for 2 hours. This resulted in about 20 g of an erionite exchanged with 1.5 wt. % copper and 1.3 wt. % iron, called K1 below.

COMPARATIVE EXAMPLE 1

The procedure described in example 1 was repeated with the difference that the iron acetylacetonate was omitted. This resulted in about 20 g of an erionite exchanged with 1.5 wt. % copper, called VK1 below.

COMPARATIVE EXAMPLE 2

The procedure described in example 1 was repeated with the difference that the copper acetylacetonate was omitted and iron acetylacetonate was used in an amount of 2.53 g. This resulted in about 20 g of an erionite exchanged with 2.0 wt % iron, called VK2 below.

EXAMPLE 2

The procedure described in example 1 was repeated with the difference that 19.8 g of a levyne with an SAR value of 30 were used instead of erionite. This resulted in about 20 g of a levyne exchanged with 1.5 wt. % copper and 1.3 wt. % iron, called K2 below.

COMPARATIVE EXAMPLE 3

The procedure described in example 2 was repeated with the difference that the iron acetylacetonate was omitted. This resulted in about 20 g of a levyne exchanged with 1.5 wt. % copper, called VK3 below.

COMPARATIVE EXAMPLE 4

The procedure described in example 2 was repeated with the difference that the copper acetylacetonate was omitted and iron acetylacetonate was used in an amount of 2.53 g. This resulted in about 20 g of a levyne exchanged with 2.0 wt. %, iron, called VK4 below.

COMPARATIVE EXAMPLE 5

The procedure described in example 1 was repeated with the difference that 19.8 g of a chabazite with an SAR value of 28 was used instead of erionite. This resulted in about 20 g of a chabazite exchanged with 1.5 wt. % copper and 1.3 wt. % iron, called VK5 below.

COMPARATIVE EXAMPLE 6

The procedure described in comparative example 5 was repeated with the difference that the iron acetylacetonate was omitted. This resulted in about 20 g of a chabazite exchanged with 1.5 wt. % copper, called VK6 below.

COMPARATIVE EXAMPLE 7

The procedure described in comparative example 5 was repeated with the difference that the copper acetylacetonate was omitted and iron acetylacetonate was used in an amount of 2.53 g. This resulted in about 20 g of a chabazite exchanged with 2.0 wt. % iron, called VK7 below.

COMPARATIVE EXPERIMENTS a) The catalysts K1 and K2 as well as VK1 to VK7 were fresh and compared. The aging was carried out at 580° C. in 10% $H_2O$ and 10% $O_2$ in $N_2$ for 100 hours.

b) The SCR activity of aged catalysts K1 and K2 as well as VK1 to VK7 was tested in a fixed bed quartz reactor under the conditions given in the table below.

For this purpose, the catalyst powders were first screened and the fraction of 500 to 700 μm was used for the test.

They were then heated in $N_2$ to 600° C., then to the test gas (see table below) and cooled to 100° C. at 2 K/min. Meanwhile, the conversion of NO with $NH_3$ was monitored by means of online FT-IR.

| Gas/Parameter | Concentration/Conditions |
| --- | --- |
| $NH_3$ | 450 ppm |
| NO | 500 ppm |
| $H_2O$ | 5% |
| $O_2$ | 5% |
| $N_2$ | Rest |
| Temperature | Cooling 600 to 100° C. @ −2° C./min |
| Space velocity | 130.000 $h^{-1}$ |

Figure 2:
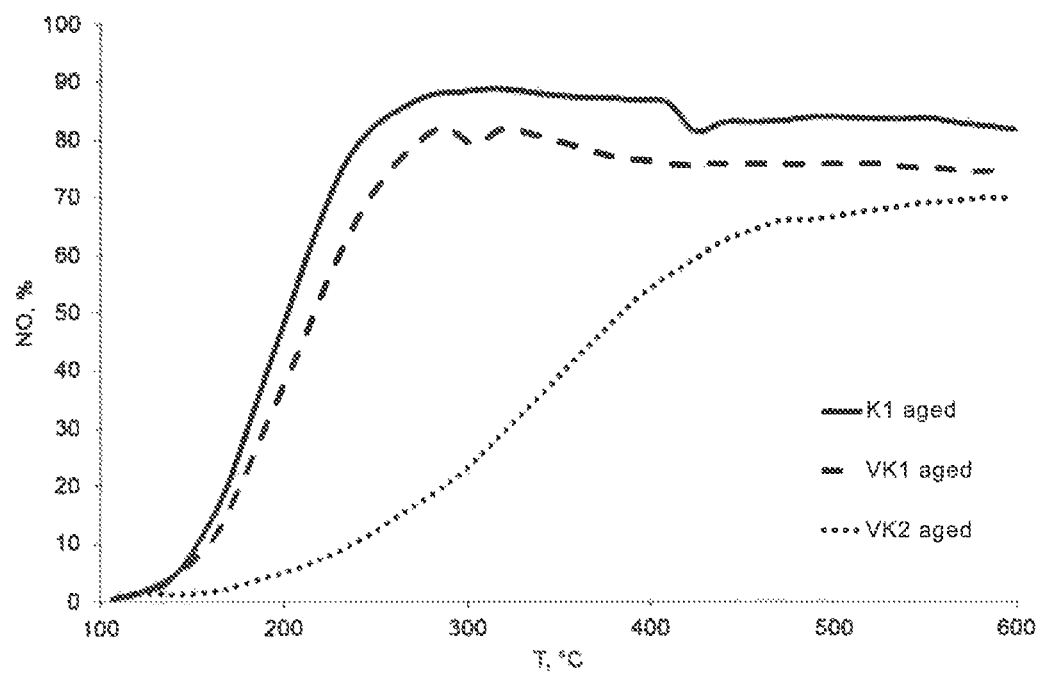
FIG. 2 shows the SCR activity of K1, VK1 and VK2 in the aged state
Figure 3:
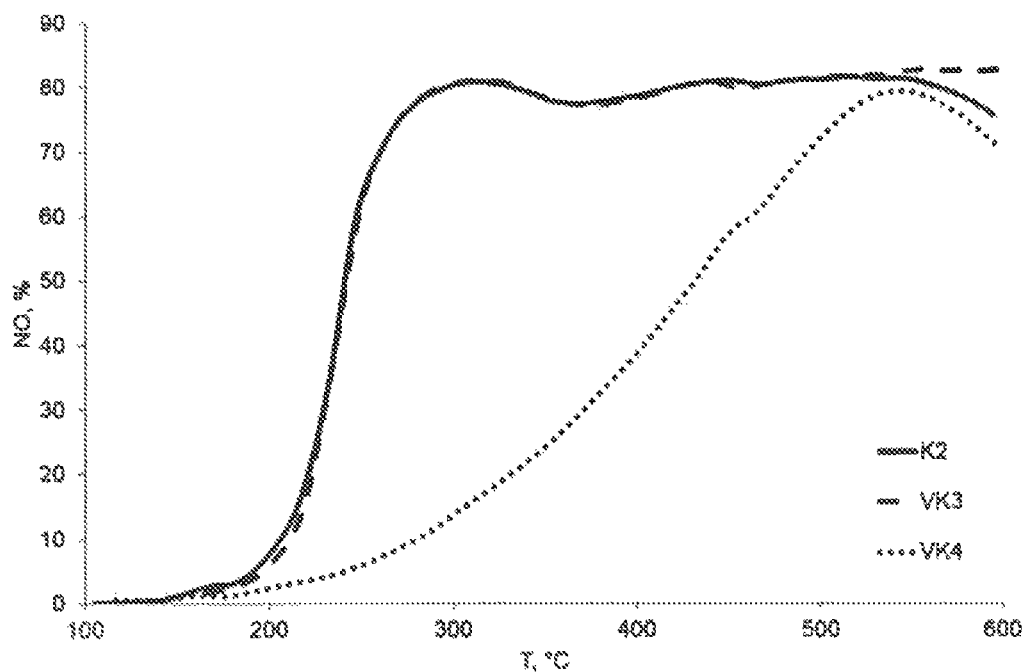
FIG. 3 shows the SCR activity of K2, VK3 and VK4 in the fresh state
Figure 4:
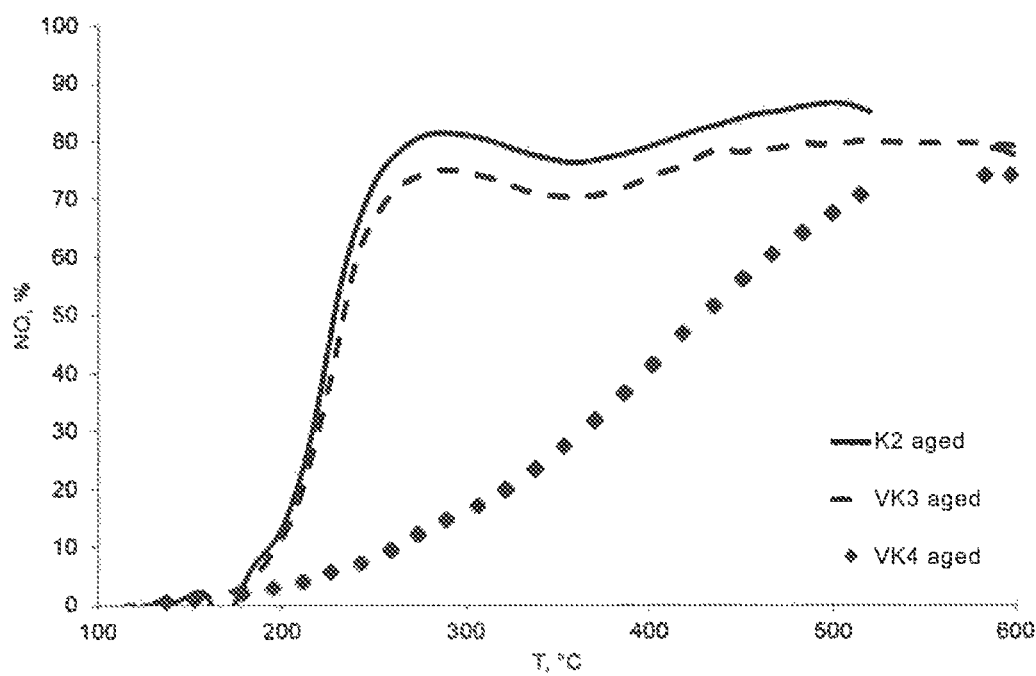
FIG. 4 shows the SCR activity of K2, VK3 and VK4 in the aged state
Figure 5:
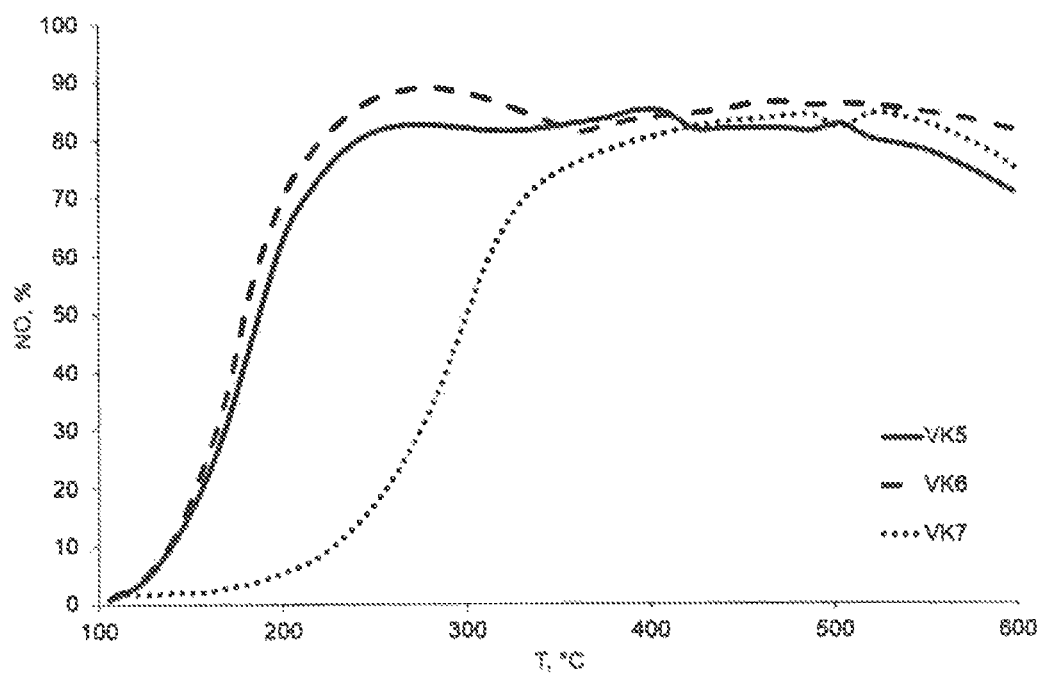
FIG. 5 shows the SCR activity of VK5, VK6 and VK7 in the fresh state
Figure 6:
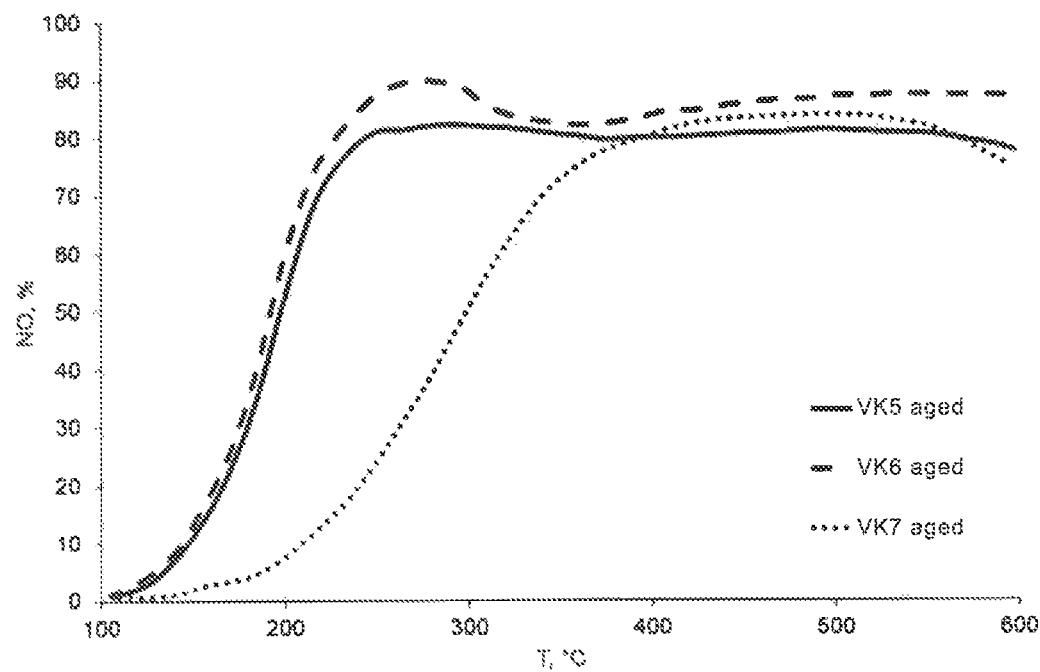
FIG. 6 shows the SCR activity of VK5, VK6 and VK7 in the aged state

The results are shown in FIGS. 1 to 6.

In the fresh state, K1 (copper- and iron-containing erionite) thus already exhibits distinct advantages compared to VK1 (copper-containing erionite) and VK2 (iron-containing erionite), which still increase in the aged state. A similar picture results when comparing K2 (copper- and iron-containing levyne) with VK3 (copper-containing levyne) and VK4 (iron-containing levyne). While K2 and VK3 deliver approximately the same results in the fresh state, K2 has considerable advantages in the aged state. A different picture results when comparing the chabazite-containing VK5, VK6 and VK7. Here, VK6 containing only copper provides the best results in the fresh and aged state.

The invention claimed is:

1. A catalyst comprising a small-pore zeolite that contains iron and copper and has a maximum ring size of eight tetrahedral atoms, wherein the small-pore zeolite has a structure of type EAB, ERI, ESV, JBW or LEV, and wherein a channel width of the small-pore zeolite amounts to ≥0.47 nm (4.7 Å) in at least one dimension, and wherein the small-pore zeolite comprises copper in an amount of 1.0 to 1.9 wt. %, calculated as Cu, and iron in an amount of 1.0 to 2.0 wt. %, calculated as Fe, based in each case on the total weight of the small-pore zeolite with the copper and iron, and wherein the small pore zeolite contains no further metal besides copper and iron.

2. A catalyst comprising a small-pore zeolite that contains iron and copper and has a maximum ring size of eight tetrahedral atoms, wherein the small-pore zeolite has a structure type of EAB, ERI, ESV, JBW or LEV, and wherein a channel width of the small-pore zeolite amounts to >0.38 nm (3.8 Å) in at least one dimension, and wherein the small-pore zeolite comprises copper in an amount of 1.5 wt. %, calculated as Cu, and iron in an amount of 1.3 wt. %, calculated as Fe, based in each case on the total weight of the small-pore zeolite with the copper and iron, and wherein the small pore zeolite contains no further metal besides copper and iron.

3. The catalyst according to claim 1, wherein the small-pore zeolite is of the structure type ERI or LEV.

4. The catalyst according to claim 1, wherein the small-pore zeolite has a SAR value of 1 to 50.

5. The catalyst according to claim 1, wherein the small-pore zeolite is of the structure type ERI and has an SAR value of 5 to 15.

6. The catalyst according to claim 2, wherein the molar ratio of Cu:Al is 0.03 to 0.10.

7. The catalyst according to claim 2, wherein the molar ratio of (Cu+Fe):Al is 0.12 to 0.2.

8. The catalyst according to claim 1, wherein the small-pore zeolite is of the structure type LEV and has a SAR value of 20 to 40.

9. The catalyst according to claim 8, wherein a molar ratio of Cu:Al is 0.15 to 0.30.

10. The catalyst according to claim 8, wherein a molar ratio of (Cu+Fe):Al is 0.32 to 0.50.

11. The catalyst according to claim 1, wherein the catalyst is present in a form of a coating on a carrier substrate.

12. The catalyst according to claim 11, wherein the carrier substrate is a flow-through substrate or a wall-flow filter.

13. The catalyst according to claim 11, wherein the carrier substrate is inert and consists of silicon carbide, aluminum titanate or cordierite.

14. The catalyst according to claim 11, wherein the carrier substrate comprises a catalytically active material.

15. The catalyst according to claim 14, wherein the carrier substrate comprises an SCR catalytically active material.

16. The catalyst according to claim 14, wherein the catalytically active material comprises a mixed oxide containing vanadium, titanium and tungsten compounds.

17. The catalyst according to claim 1, wherein the catalyst is present as part of a carrier substrate.

18. The catalyst according to claim 17, wherein the carrier substrate is a flow-through substrate or a wall-flow filter.

19. The catalyst according to claim 17, wherein the carrier substrate is coated with a catalytically active material.

20. The catalyst according to claim 2, wherein the channel width of the small-pore zeolite is ≥0.47 nm (4.7 Å) in at least one dimension.

21. A method for purifying exhaust gas of lean-operated combustion engines, wherein the exhaust gas is passed over a catalyst according to claim 1.

22. A system for purifying exhaust gas from lean-operated combustion engines, wherein the system comprises the catalyst according to claim 1 as well as an injector for aqueous urea solution, wherein the injector is located upstream of the catalyst.

23. The system according to claim 22, wherein the system further comprises an oxidation catalyst.

24. The system according to claim 23, wherein the oxidation catalyst includes platinum.

25. A catalyst comprising a small-pore zeolite that contains iron and copper and has a maximum ring size of eight tetrahedral atoms, and wherein the small-pore zeolite comprises copper in an amount of 1.0 to 1.9 wt. %, calculated as Cu and iron in an amount of 1.0 to 2.0 wt. %, calculated as Fe, based in each case on the total weight of the small-pore zeolite with the copper and iron, and wherein the small pore zeolite contains no further metal besides copper and iron, wherein the small-pore zeolite has either a structure type of ERI with an SAR value of 5 to 15, or a structure type of LEV with an SAR value of 20 to 40, and wherein a channel width of the small-pore zeolite is 0.48 to 0.51 nm in at least one dimension.

* * * * *